(No Model.)

S. T. HUGHES.
EXPANSION JOINT FOR PIPES.

No. 338,599. Patented Mar. 23, 1886.

WITNESSES
J. B. McGirr.
R. E. Grant.

Samuel T. Hughes
INVENTOR
by Connolly Bros,
Attys

N. PETERS. Photo-Lithographer, Washington, D. C.

UNITED STATES PATENT OFFICE.

SAMUEL T. HUGHES, OF CANNONSBURG, PENNSYLVANIA.

EXPANSION-JOINT FOR PIPES.

SPECIFICATION forming part of Letters Patent No. 338,599, dated March 23, 1886.

Application filed February 8, 1886. Serial No. 191,154. (No model.)

*To all whom it may concern:*

Be it known that I, SAMUEL T. HUGHES, a citizen of the United States, residing at Cannonsburg, in the county of Washington and State of Pennsylvania, have invented certain new and useful Improvements in Expansion-Joints for Gas or Water Pipes; and I do hereby declare the following to be a full, clear, and exact description of the invention, such as will enable others skilled in the art to which it appertains to make and use the same.

This invention has relation to expansion-joints for gas or water pipes, and has for it object the provision of a joint which will not only be perfectly tight as against any leakage, but will permit of the free expansion and contraction of the pipe or conduit to which it is applied without in any manner affecting the tightness of the joint.

Having the above objects in view, my invention consists in an expansion joint or coupling consisting of a sleeve, bowl, or collar rigidly attached to one of the sections of the pipe or conduit to be coupled, having an interior chamber for the reception of the end of the next adjacent section of the pipe or conduit, and a bush or collar screwing into the end of said chamber and surrounding the last-named section of the pipe or conduit, the latter being provided with a nut or washer adapted to move freely in the chamber of the bowl or sleeve, two spiral springs surrounding the pipe on each side of the nut, and two washers, of leather, rubber, fiber, or other appropriate material, placed at the ends of the spiral springs and serving, as will be presently described, to pack and seal the joint or coupling against leakage.

Figure 1:
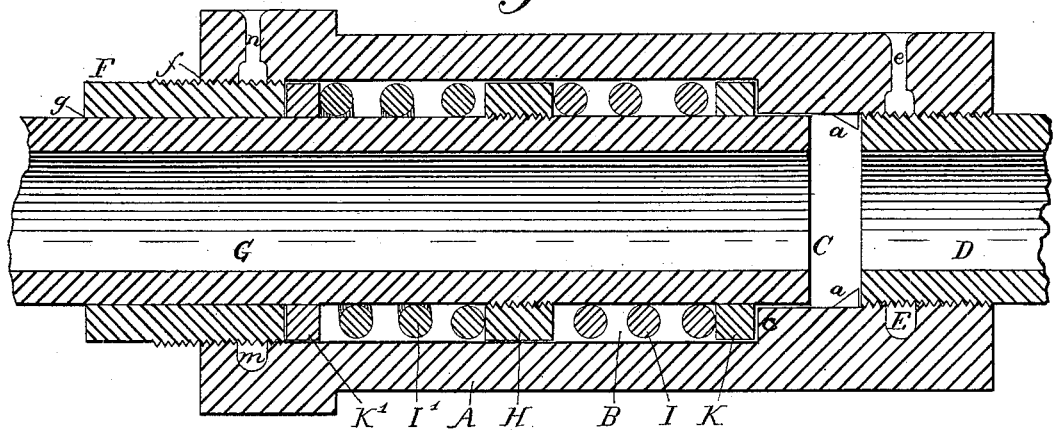
Figure 2:
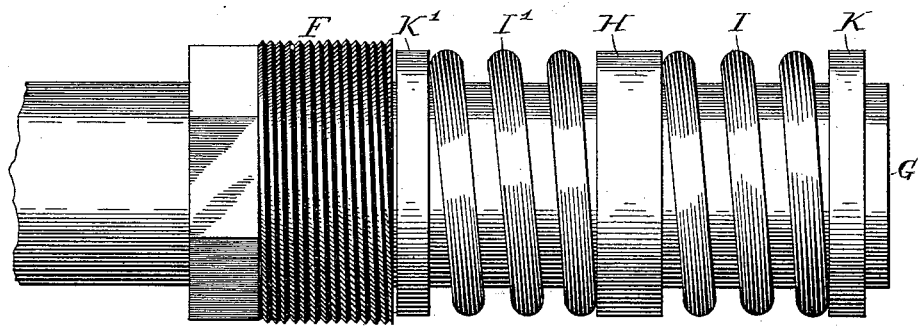

In the accompanying drawings, wherein Figure 1 is a longitudinal sectional view of the complete joint, and Fig. 2 a plan view of the movable section of pipe, showing the spiral springs, the fixed nut, and the washers in position thereon, A designates the bowl, sleeve, or casing forming the main body of the coupling. This bowl has a central opening, B, which is contracted at one end, as at C, and interiorly screw-threaded at that part for the reception of the screw-threaded end of a pipe-section, D. Stops $a\ a$ are formed in the interior of the opening C, to limit the extent to which the section D may be screwed in the bowl. An annular groove or chamber, E, having a port, $e$, surrounds the end of the pipe-section D, and serves for the reception of a suitable packing material—such as lead or the like—which is poured into the port $e$ while in a liquid state, and serves to tightly seal the joint at this point. At its other end the bowl A is screw-threaded, as at $f$, and receives a similarly screw-threaded bush or sleeve, F, having a smooth central opening, as at $g$, for the passage of the movable section of pipe G, which, as shown, passes through the sleeve F, and projects into the contracted portion C at the other end of the bowl A. A metallic nut or washer, H, is fixed upon the section G at a short distance from its end, and on each side of the washer H are placed large and stiff spiral springs I I'. Washers K K', of any suitable material, are fitted loosely upon the section G at the end of each of the spiral springs, one of said washers bearing against the inner end of the bush or sleeve F, while the other bears against a shoulder, $c$, at the end of the contracted part C of the bowl. An annular groove or chamber, $m$, is formed in the interior of the bowl, near the end through which the bush or sleeve F passes, and receives a suitable packing material, which is introduced through a port, $n$. When the bush or sleeve F is in proper position, its end projects out somewhat from the end of the bowl A, and is formed with flat surfaces, giving it a square, octagonal, or other shape, so as to receive a wrench or other tool, by means of which the bush may be screwed into the bowl.

Being constructed as above described, the operation of my improved expansion joint or coupling is as follows: When the pipe expands, the washer K is pressed against the shoulder $c$ by the spiral spring I, thereby sealing the joint at that end, the pressure of the spring upon the flexible washer serving to spread the latter out laterally against the inner wall of the bowl and in against the surface of the pipe-section G. When the pipe contracts, the washer K' is similarly compressed by the spring I', and thus seals the joint at that point. While the flexible washers K K' are thus spread out by the contraction or expansion of the pipe it is to be understood that at all times they are pressed sufficiently tight against their respective seats to maintain a perfectly-tight joint.

Having fully described my invention, I claim—

1. In an expansion-joint for pipes or conduits, the combination, with an exterior casing or bowl having an interior chamber, of a pipe-section passing into said chamber, a rigid nut or washer affixed to said section, spiral springs surrounding the same on each side of the washer, and flexible washers surrounding the pipe at the ends of said springs, substantially as described.

2. In an expansion-joint for pipes or conduits, the combination, with the bowl A, having the contracted portion C and chamber B, of the bush or sleeve F, fitting the end of said chamber, the pipe-section G, passing through said bush, the rigid nut or washer H upon said section, the spiral springs I I', and the washers K K', substantially as described.

In testimony whereof I have affixed my signature in presence of two witnesses.

SAMUEL T. HUGHES.

Witnesses:
FRANK SPORDE,
MIKEL ROOK.